(12) United States Patent
Metz (10) Patent No.: US 8,908,063 B2
(45) Date of Patent: Dec. 9, 2014

(54) METHOD AND APPARATUS FOR A TIME-OF-FLIGHT SENSOR WITH CHARGE STORAGE

(71) Applicant: Texas Instruments Incorporated, Dallas, TX (US)

(72) Inventor: Werner Adam Metz, Chandler, AZ (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 13/792,756

(22) Filed: Mar. 11, 2013

(65) Prior Publication Data

US 2014/0253758 A1    Sep. 11, 2014

(51) Int. Cl.
*H04N 5/76* (2006.01)
*H04N 5/232* (2006.01)

(52) U.S. Cl.
CPC .................... *H04N 5/232* (2013.01)
USPC .................................... 348/231.99

(58) Field of Classification Search
CPC ............................ H04N 5/369; H04N 5/335
USPC ........................................................ 348/231.99
See application file for complete search history.

(56) References Cited

U.S. PATENT DOCUMENTS

| | | | |
|---|---|---|---|
| RE42,292 E * | 4/2011 | Berezin et al. | 438/57 |
| 8,654,219 B2 * | 2/2014 | Im et al. | 348/246 |
| 2008/0048100 A1 * | 2/2008 | Bamji et al. | 250/214 A |
| 2009/0167923 A1 * | 7/2009 | Safaee-Rad et al. | 348/345 |
| 2010/0053405 A1 * | 3/2010 | Lehmann et al. | 348/311 |
| 2010/0231774 A1 * | 9/2010 | Tashiro | 348/311 |
| 2011/0273561 A1 * | 11/2011 | Oggier et al. | 348/135 |
| 2013/0070132 A1 * | 3/2013 | Lehmann et al. | 348/294 |
| 2013/0076993 A1 * | 3/2013 | Wyllie | 348/836 |

* cited by examiner

*Primary Examiner* — Aung S Moe
*Assistant Examiner* — Amy Hsu
(74) *Attorney, Agent, or Firm* — Alan A. R. Cooper; Frederick J. Telecky, Jr.

(57) ABSTRACT

A time-of-flight sensor device includes analog memory to store one or more sets of charges associated with a time-of-flight image frame captured by a time-of-flight pixel array. So configured, the time-of-flight sensor device greatly reduces or eliminates the need for digital memory otherwise required to store image data prior to processing.

15 Claims, 7 Drawing Sheets

METHOD AND APPARATUS FOR A TIME-OF-FLIGHT SENSOR WITH CHARGE STORAGE

TECHNICAL FIELD

This invention relates generally to time-of-flight sensors.

BACKGROUND

Time-of-flight sensors, as generally understood in the art, are used to determine a distance of an object or plurality of objects from the sensor. Time-of-flight sensors operate by detecting light reflected off of a surface of the object where the light is emitted from an illuminator that is generally co-located with the sensor. Using the time-of-flight sensor, a processing device can determine the round-trip travel time of light emitted from the light source and reflected off of the object back to the sensor. With this information, and with the knowledge of the speed of light (constant c), the processing device can determine the distance of the object.

Typically, eight data points per pixel are used to calculate distances, though more or less may be used. Usually, two data points (X and Y) are acquired per pixel per frame with four frames captured sequentially. Under normal circumstances, a processor cannot perform the calculations on the acquired data until all data has been captured. Thus, a need exists to store the data until such a time as all data points have been captured.

Systems employing time-of-flight sensors will store the captured data points in binary form in a digital memory, such as SRAM, DRAM, or other common memory formats, until such time as all data points are captured and the distance calculation can be completed. However, digital storage of all the data points can increase the cost of devices utilizing time-of-flight sensors, increase processing power, increase processing or information transportation time, increase space requirements, or may otherwise be impracticable. For example, with embedded systems in particular, the memory required might be too large to supply on chip. Also, such memory requirements may increase the cost of an end device by requiring a separate memory chip and interface to store the data points until processing time. Accordingly, it is desirable to provide an efficient and low cost solution to store the data points.

SUMMARY

Generally speaking and pursuant to these various approaches, a time-of-flight sensor is provided that includes on-chip analog memory to store at least one set of charges associated with an image frame. So configured, an amount of digital memory required for storage of image data prior to processing time is greatly reduced or eliminated, thus reducing overall cost associated with devices utilizing time-of-flight sensors while providing an efficient performance. These and other benefits may become clearer upon making a thorough review and study of the following detailed description.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
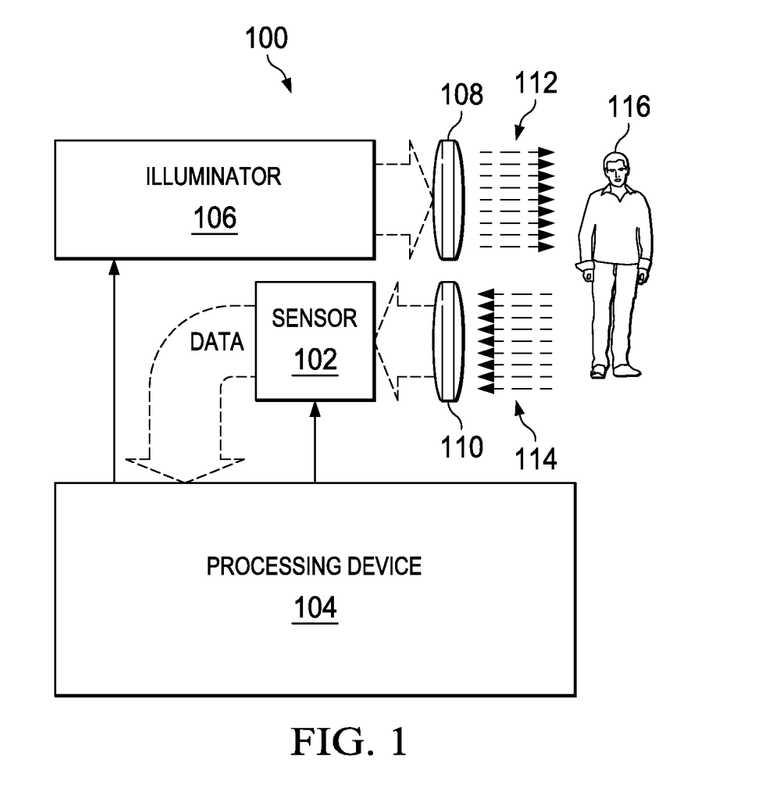
FIG. 1 is a block diagram of an example contextual apparatus for a time-of-flight sensor in accordance with various approaches.

Referring now to the drawings, FIG. 1 illustrates a block diagram of an example contextual apparatus 100 for a time-of-flight sensor 102 in accordance with various approaches. The example contextual apparatus 100 is provided merely to aid the reader in understanding the use and purpose of the various embodiments of the time-of-flight sensor 102 and is not meant to be limiting in any sense. The illustrated contextual apparatus 100 may be a dedicated time-of-flight apparatus or other non-time-of-flight-dedicated apparatus that utilizes such features (such as measurement devices, a mobile phone, a PDA, a tablet, or the like). The specific details of the contextual apparatus 100, however, are not required to form an understanding of the specifics of the disclosed time-of-flight sensor 102.

The example contextual apparatus 100 includes the time-of-flight sensor 102 operatively coupled to at least one processing device 104. At least one illuminator 106 is operatively coupled to the processing device 104 as well. The illuminator 106 and the time-of-flight sensor 102 may be equipped with or coupled to various optical elements 108 and 110, such as lenses, prisms, or the like. For example, the illuminator 106 may be equipped with a lens 108 to effect dispersion or focusing of emitted light 112, or simply a clear or translucent membrane to protect the illuminator 106. Further, the time-of-flight sensor 102 may be configured to receive incoming light 114 through one or more lenses 110 to focus the image upon the sensor 102, in much the same manner as an image sensor of a conventional digital camera.

In operation, the example contextual time-of-flight apparatus 100 is configured to generate depth map frames 312 (see FIG. 3) as are commensurate with time-of-flight sensing and/or imagery or other uses. Depth map frames 312 can be generated by many means, but time-of-flight apparatuses 100 generally operate on the principle that a distance to a surface of a detected object 116 can be calculated if the speed of an item, substance, or phenomenon (i.e., photons or light) is known and the time required to travel that distance is known. In this instance, the speed of light is known (the constant c, approximately 300,000,000 meters per second), and the time that light takes to travel from the illuminator 106 to the detected object 116 and back to the sensor 102 can be measured. Though the illuminator 106 and sensor 102 are not necessarily required to be co-located (or nearly co-located as compared to the distance of the object), if they are co-located, then the distance is simply half of the total distance measured for the round trip.

Various kinds of light can be emitted by the illuminator 106, including infrared light, visible spectrum light, or ultraviolet light. In other approaches, other forms of electromagnetic radiation can be utilized, including radio waves, microwaves, x-rays, and gamma rays, or any combination thereof. IR light is often utilized as it is invisible to humans, can be relatively inexpensive to produce, and behaves similarly to visible light. Accordingly, IR light is assumed to be used in this disclosure as a non-limiting example for the sake of description and widespread applicability.

The illuminator 106 may comprise various known or unknown light emitters, such as a light emitting diode (LED), lasers, precision incandescent lights, shuttered light sources, and other precision light sources. In some situations, an LED is ideally suited for use as the illuminator 106 as its light emission start and stop times can be controlled with high precision to produce well defined pulses of emitted light 112, which can aid in the precision of the measurements. Further, LEDs provide an efficient solution as the illuminator output power is high compared to the input electrical power.

In one example, a depth z can be calculated or estimated for each pixel of a time-of-flight sensor 102 based on the following equation:

$$z = \frac{c\Phi}{4\pi f} \quad [1]$$

where c is the speed of light, $\Phi$ is the angular phase of the detected pulse of light 114 with respect to the emitted pulse of light 112, and f is the modulated frequency of the emitted light 112. In this configuration, the maximum distance that can be reliably detected is determined by the following equation:

$$z_{max} = \frac{c}{2f}. \quad [2]$$

Any distance past that may either result in failure to detect or aliasing if the distance is so far that the reflected pulse of light 114 arrives at the sensor 102 during the next sensor reading period. It should be noted, however, that aliasing issues can be alleviated or accommodated for by utilizing techniques involving varying the frequency or period of the emitted pulses of light 112 so that the apparatus 100 can determine which outgoing pulse it detected (i.e., the one it is currently emitting or just sent out, or the previous pulse, or a pulse even prior to that). However, it should also be noted that the further the detected object 122 is from the illuminator 106 and sensor 102, the weaker the power of the reflected pulse of light 114 will be, to a point where a given apparatus 100 may not be able to detect the reflected pulse of light 114 due to being lost in the noise or being simply too weak.

Figure 2:
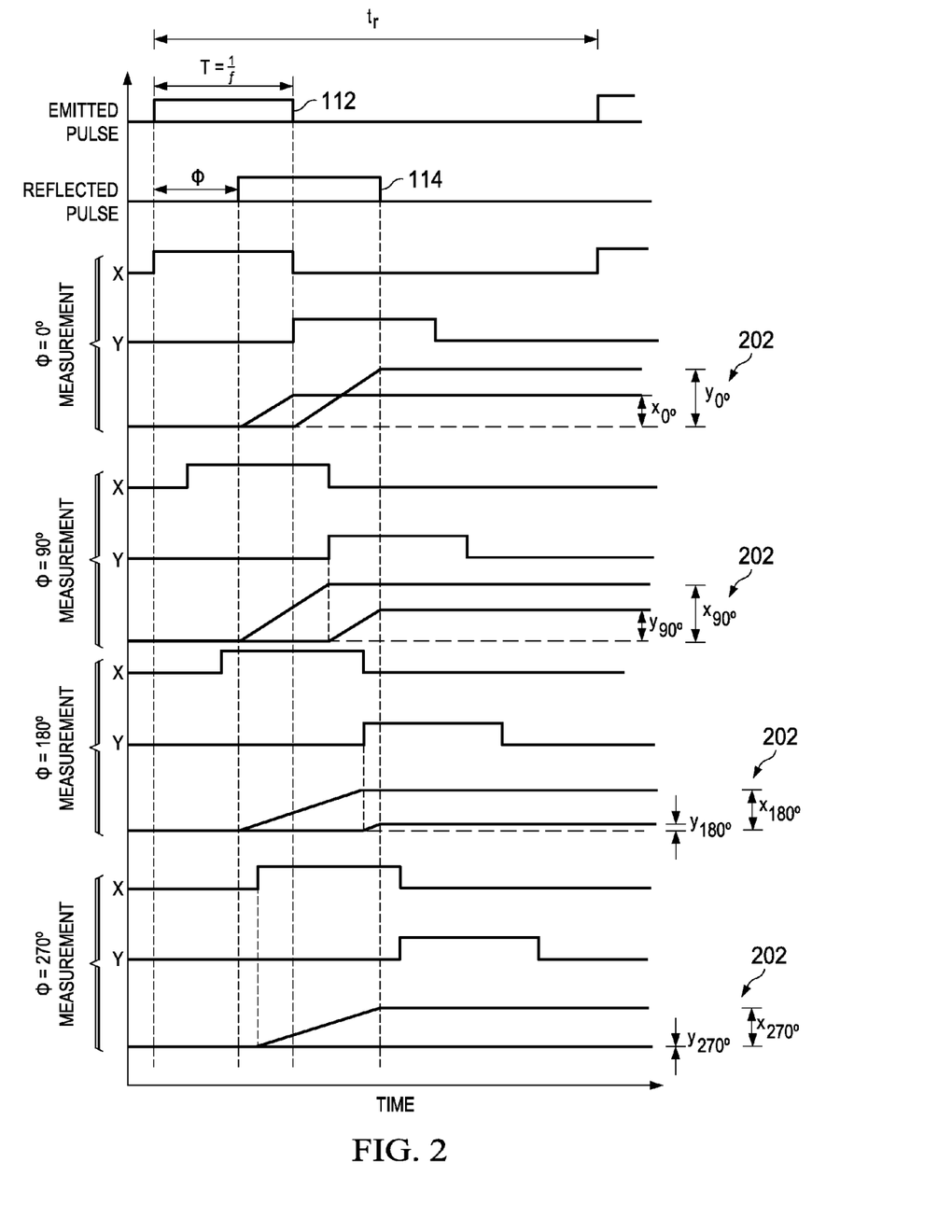
FIG. 2 is a chart of signal charges representing the operation of a time-of-flight sensor in accordance with various approaches.

FIG. 2 illustrates a signal-based representation of an example operation of a time-of-flight apparatus 100. As described above, the top signal represents an outgoing emitted pulse of light 112. The outgoing emitted pulse of light 112 is emitted with a frequency of f, which, when depicted in the time-based scale of FIG. 2, is represented by its pulse width period T, which is simply 1/f. The emitted pulse of light 112 may be re-transmitted after a time $t_r$. The second signal represents the reflected pulse of light 114 received at a pixel of the time-of-flight sensor 102. As is shown in FIG. 2, the reflected pulse of light 114 is delayed as compared to the emitted pulse of light 112 by an angular phase $\Phi$ of the period T of the emitted pulse of light 112. As an example, FIG. 2 shows the phase $\Phi$ as approximately 225° (i.e., five-eighths), meaning the beginning of the reflected pulse of light 114 first hit the sensor 102 about five-eighths through the period T during which that same pulse of light 112 was being emitted.

One method of determining the phase $\Phi$ of the reflected pulse of light 114 is to utilize two photosites in each pixel, called photosite X and photosite Y. The photosites each measure the light received at the pixel during different time segments to generate a charge pair comprising an X charge and a Y charge. As is shown in FIG. 2, for example, photosite X may be active during the same period T during which the emitted pulse of light 112 is emitted. By one approach, the time period T is chosen to be ½ that of the entire period to maximize the time for light emission and thus lower the average power required for a given total flux. At the end of that period T, photosite X may discontinue measurement of received light 114 while at the same time photosite Y may begin measurement of received light 114. Photosite Y may make a measurement for the same duration of time period T as did photosite X. As photons from the reflected pulse of light 114 hits each photosite, they will each build and store a charge 202 during the time which each photosite is enabled to measure the reflected pulse of light 114. The charge 202 generated at photosite X is represented by the line $x_{0°}$, and the charge 202 generated at photosite Y is represented by the line $y_{0°}$. During the time which photosite X is active, as the reflected pulse of light 114 begins to encounter the pixel, photosite X will build a charge X as more photons continue to be collected in photosite X. This is shown by the positive slope of the line $x_{0°}$ during the time the reflected pulse of light 114 encounters photosite X while it is active. Similarly, when photosite Y becomes active, it will generate and store a charge Y as is shown by the positive slope of the line $y_{0°}$ during the time when the reflected pulse of light 114 encounters photosite Y while it is active. Upon the completion of the measurement duration time, the charge pair $x_{0°}$ and $y_{0°}$ can be eventually collected and converted into digital signals to be processed by the processing device 104 to calculate the phase Φ of the reflected pulse of light 114.

It should be noted that although two photosites X and Y are described, other configurations are possible. For example, a single photosite can be utilized that employs a fast switching gate arrangement that will store the accumulated charge 202 into two separate charge wells or charge repositories during their respective times, one storing the X charge representing the time during which the representative "photosite X" is active and the other storing the Y charge representing the time during which the representative "photosite Y" is active.

Continuing with FIG. 2, it may be beneficial in certain examples to take measurements of the phase Φ of the reflected pulses of light across a plurality of measurement period phases φ, wherein the angular phase φ of the active times of photosites X and Y are shifted by various amounts. For instance, and as is depicted in FIG. 2, four equally spaced phase φ measurements periods are shown, one at φ=0°, one at φ=90°, one at φ=180°, and one at φ=270°, though many other configurations are possible by varying the number and phase φ of the measurement periods. The four depicted phase measurements periods represent four different times measuring four different reflected pulse of light 114, but are depicted in relation to a single emitted and reflected pulse of light 114 for simplicity. The phased measurement periods will provide different values of the charges X and Y 202 for each phase φ measurement period (i.e., $x_{0°}$ and $y_{0°}$, $x_{90°}$ and $y_{90°}$, $x_{180°}$ and $y_{180°}$, $x_{270°}$ and $y_{270°}$) to provide additional information with which to make a more accurate reflected pulse of light 114 phase Φ estimate. The measurements at each phase φ, resulting from the X and Y charge readings, are represented by m(φ=0°), m(φ=90°), m(φ=180°), and m(φ=270°), respectively. Phase Φ can then be calculated according to the following formula:

$$\Phi = \frac{m(\varphi = 0°) - m(\varphi = 180°)}{m(\varphi = 90°) - m(\varphi = 180°)}. \quad [3]$$

This more accurate phase Φ estimate can then be inserted into formula [1] above to calculate distance z measured at the subject pixel. When this occurs for an entire set of pixels for a time-of-flight sensor 102, a depth map frame 312 can be formed. The depth map frame 312 represents distances z for each pixel, resulting in a three-dimensional (3D) reading or image.

Figure 3:
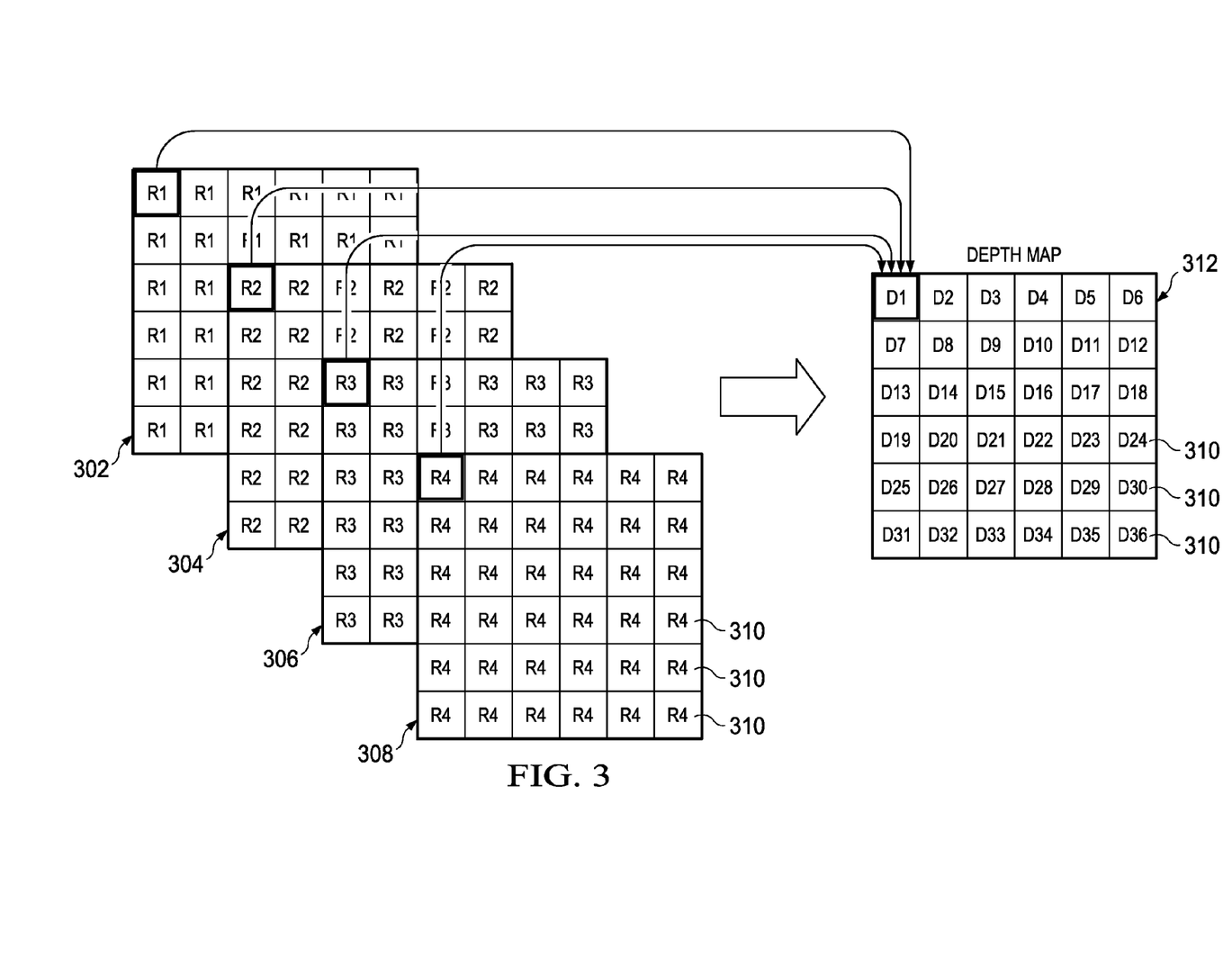
FIG. 3 illustrates a simplified view of a depth map frame creation process in accordance with at least one approach.

FIG. 3 illustrates a simplified view of the depth map frame 312 creation process in accordance with at least one embodiment. Each reading m(φ=0°), m(φ=) 90°, and so forth, by the time-of-flight sensor 102 is represented by the image frames 302, 304, 306, and 308. For each phase φ measurement, the respective image frame 302, 304, 306, 308 will contain individual measurements for each pixel 310 (i.e., charges X and Y 202), represented in FIG. 3 as "R1" for m(φ=0°), "R2" for m(φ=90°), and so forth. The various measurements for each pixel 310 may then be processed per equations [3] and [1] above to produce the depth map frame 312. As shown in FIG. 3, each pixel 310 of the depth map frame 312 has a corresponding calculated z value represented by "D1", "D2", and so forth. The depth map frame 312 can then be used for many purposes, one of which includes combining it with a standard two-dimensional image taken simultaneously, or near simultaneously, to provide depth to each 2D pixel resulting in a visible 3D image.

As is described above, various approaches require multiple sets of data to properly form a depth map frame 312. In one approach, four frame images 302, 304, 306, 308 are taken, each pixel 310 of each image frame 302, 304, 306, 308 comprising two data points (the X and Y charges 202), though other configurations involving the use of two, three, or more images frames may exist. Further, other approaches may incorporate a single data point per pixel 310, or more than two data points per pixel 310. However, for simplicity, the remainder of the description assumes an approach with four images frames 302, 304, 306, 308 and two data points (X and Y) per pixel 310. This results in 8 data points per pixel 310 to generate the depth map frame 312.

Under normal circumstances, a processing device 104 cannot perform necessary calculations on the acquired data for a pixel 310 until all the data points have been captured for that pixel 310 (i.e., X and Y for each image frame). Present solutions that do not utilize the disclosed on-chip analog memory require the data from each image frame 302, 304, 306, 308 to be offloaded from the time-of-flight sensor 102, converted to digital signals, and stored into a memory until such time as all the data points have been captured, at which time the processing device 104 can perform the calculations. The additional memory to temporarily store the multiple sets of image data can increase the cost of devices utilizing time-of-flight sensors 102, increase processing power, increase processing or information transportation time, or may otherwise be impracticable. A new time-of-flight sensor 102 is disclosed herein that omits the requirement for use of the additional memory.

Figure 4:
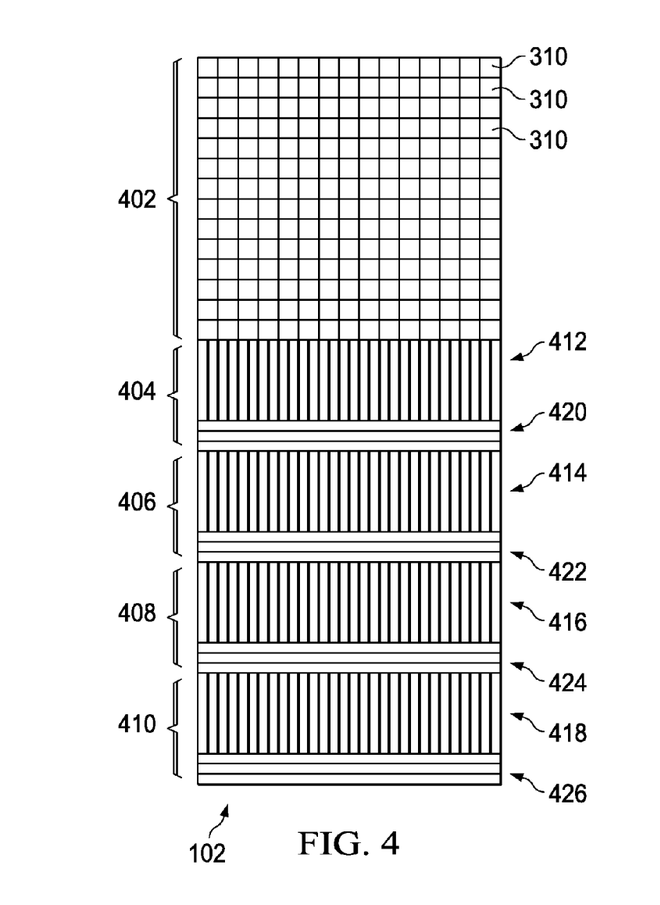
FIG. 4 illustrates a time-of-flight sensor in accordance with various approaches.

FIG. 4 illustrates a new time-of-flight sensor 102 in accordance with various embodiments. The time-of-flight sensor 102 includes a time-of-flight pixel array 402 including a plurality of time-of-flight sensor pixels 310 configured to generate at least one charge 202 (i.e., the X charge, the Y charge, or both). The pixel array 402 may be of many different known or unknown types of pixel sensor arrays, including but not limited to CMOS image sensors and Charge-Coupled Device (CCD) image sensors.

The time-of-flight sensor 102 also has a first frame storage circuit 404 and a second frame storage circuit 406. By some approaches, the time-of-flight sensor 102 may also comprise a third frame storage circuit 408 or even a fourth frame storage circuit 410. Each frame storage circuit has a set of charge storage devices 412, 414, 416, 418. The charge storage devices 412, 414, 416, 418 may be of any known or presently unknown charge storage devices, including but not limited to capacitors, n-doped or p-doped silicon, potential wells, charge repositories, gates, and the like. Typically, though not always, the number of charge storage devices 412, 414, 416, 418 in each frame storage circuit 404, 406, 408, 410 will correspond directly to the number of pixels 310 of the pixel array 402, or twice the number of pixels 310 when the two changes 202 (X and Y) are both captured for a single image frame 302, 304, 306, 308, so as to store the charge data 202 generated during each capture of each image frame 302, 304, 306, 308. Each frame storage circuit 404, 406, 408, 410 also includes an output port 420, 422, 424, 426 configured to output the charges 202 stored in each frame storage circuit 404, 406, 408, 410 for use by a processing device 104 or other device at such time as is appropriate according to the various approaches described herein.

By one approach, the set of charge storage devices 412 of the first frame storage circuit 404 are operatively coupled to the plurality of time-of-flight pixels 310 of the pixel array

402. The set of charge storage devices 414 of the second frame storage circuit 406 are operatively coupled to the first set of charge storage devices 412 of the first frame storage circuit 404. The set of charge storage devices 416 of the optional third frame storage circuit 408 are operatively coupled to the set of charge storage devices 414 of the second frame storage circuit 406. The set of charge storage devices 418 of the optional fourth frame storage circuit 410 are operatively coupled to the set of charge storage devices 416 of the third frame storage circuit 408. By a different approach, the sets of charge storage devices 412, 414, 416, 418 of each frame storage circuit 404, 406, 408, 410 may be operatively coupled to the plurality of time-of-flight pixels 310 of the pixel array 402, possibly through one or more gates, to direct the charges 202 from the pixel array 402 to the various frame storage circuits directly 404, 406, 408, 410.

Figure 5:
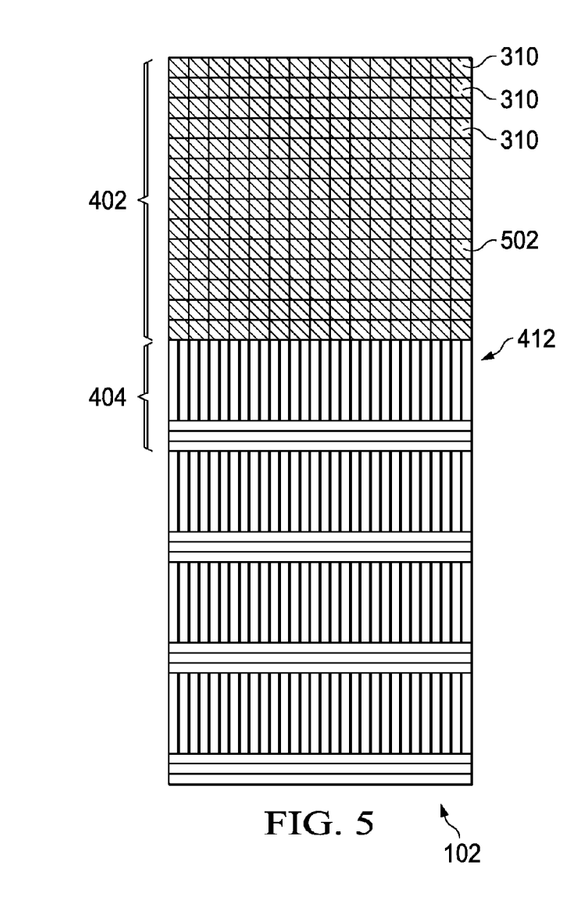
FIG. 5 illustrates charge generation by the pixel array of the time-of-flight sensor in accordance with at least one approach.
Figure 6:
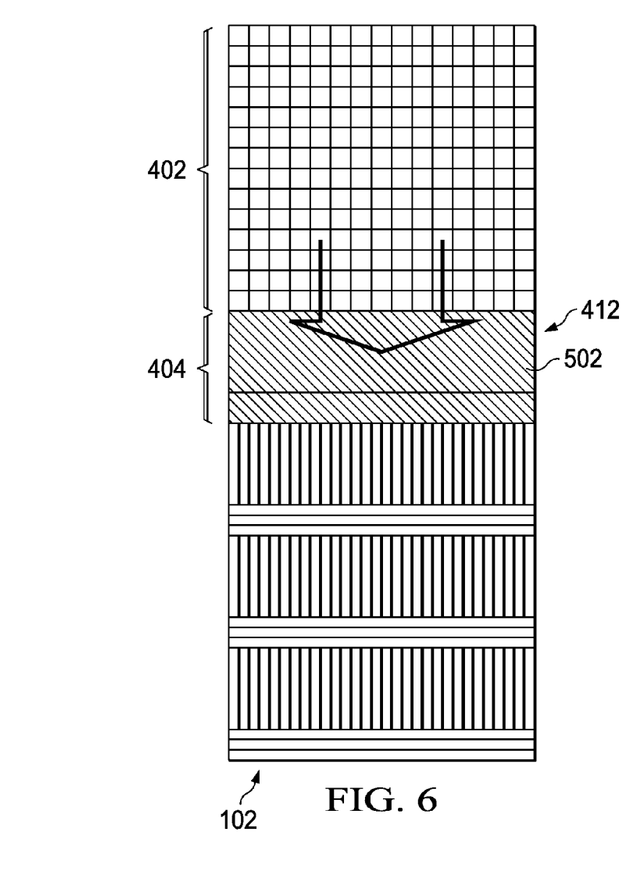
FIG. 6 illustrates a transfer of a first set of charges in the time-of-flight sensor in accordance with at least one approach.

In operation, as is shown in FIG. 5, the time-of-flight pixel array 402 will generate a first set of charges 502 that constitute the first image frame 302 as described above (possibly including the X and Y charge pair for each pixel 310). As illustrated in FIG. 6, at a first time, which is after the pixel array 402 has captured the image frame 302, the first set of charges 502 (or a set of charges corresponding to the first set of charges 502) will be shifted into the first frame storage circuit 404 for storage in the first frame storage circuit's 404 set of charge storage devices 412.

Figure 7:
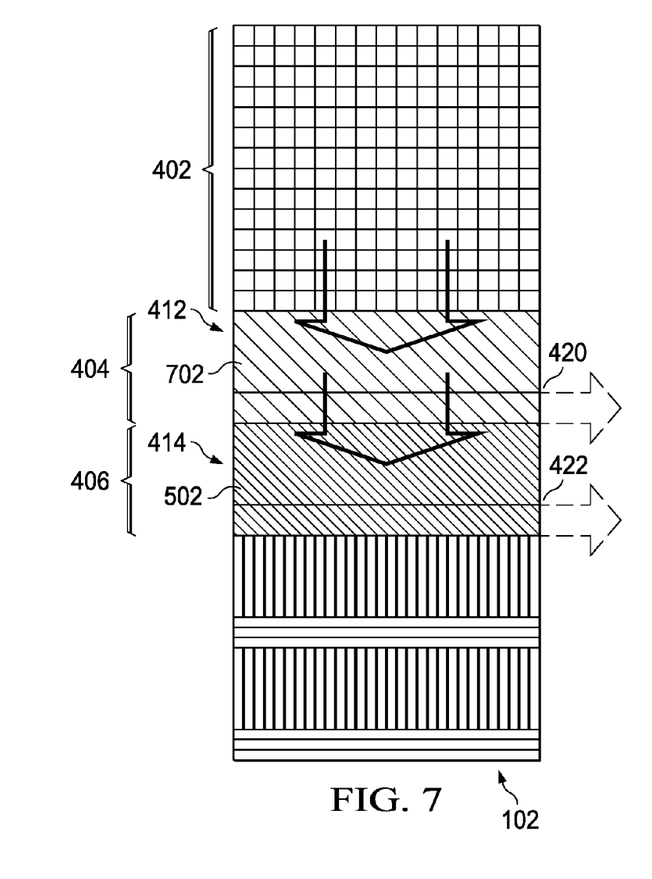
FIG. 7 illustrates a transfer of a first and a second set of charges in the time-of-flight sensor in accordance with at least one approach.

After the first set of charges 502 has been shifted out of the pixel array 402, the pixel array 402 can capture the second image frame 304 and generate a second set of charges 702 corresponding to the second image frame. As is shown in FIG. 7, at a second time, which is after generation of the second set of charges 702, the first set of charges 502 is shifted out of the first frame storage circuit 404 and into the second frame storage circuit 406 for storage in the second frame storage circuit's 406 set of charge storage devices 414. By another approach, the second frame storage circuit 406 may receive the first set of charges 502 while the second set of charges 702 is being generated during the second image frame 304 capture. Simultaneously with the transfer of the first set of charges 502 to the second frame storage circuit 406, or directly thereafter (or possibly after a delay after the start of or completion of the transfer of the first set of charges 502 to the second frame storage circuit 406), the second set of charges 702 is shifted into the first frame storage circuit 404 for storage in its set of charge storage devices 412.

At a third time, by one approach, the output ports 420, 422 of the first frame storage circuit 404 and the second frame storage circuit 406 output the contents of the first and second sets of charge storage devices 412, 414 (the first set of charges 502 being stored in the set of charge storage devices 414 of the second frame storage circuit 406, the second set of charges 702 being stored in the set of charge storage devices 412 of the first frame storage circuit 404) parallel to one another for use by the processing device 104.

Figure 8:
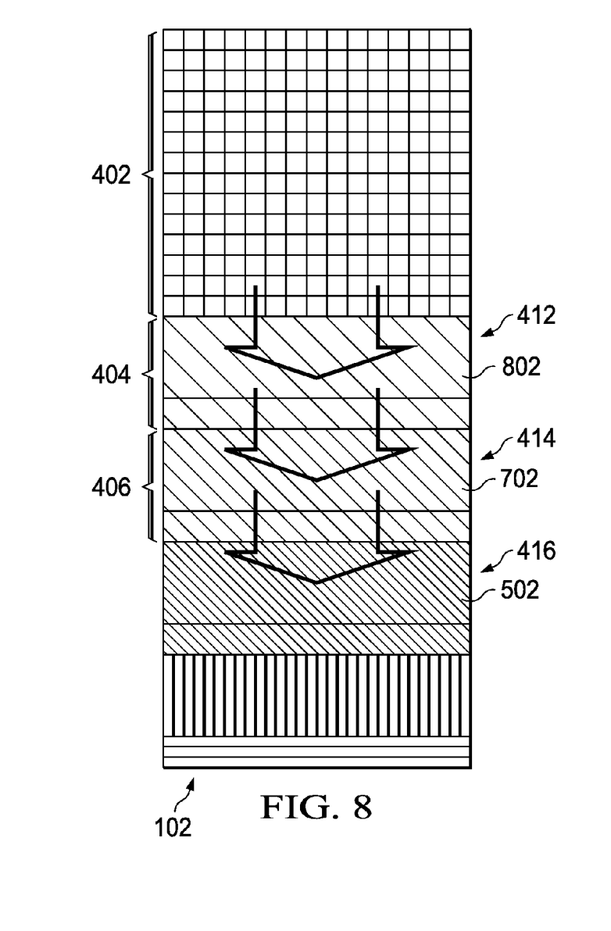
FIG. 8 illustrates a transfer of a first, second, and third set of charges in the time-of-flight sensor in accordance with at least one approach.

In an alternative approach utilizing a third frame storage circuit 408, instead of transferring the charge data 502, 702 out to the processing device 104 at the third time, the above described process will continue at the third time to capture, transfer, and store additional charge data. As illustrated in FIG. 8, at the third time, which is after the pixel array 402 generates a third set of charges 802 corresponding to a third image frame 306, the third frame storage circuit 408 receives the first set of charges 502 from the second frame storage circuit 406 for storage in the third frame storage circuit's 408 set of charge storage devices 416. Similarly, the second set of charges 702 is transferred to the second frame storage circuit 406 from the first frame storage circuit 404, and the third set of charges 802 is transferred to the first frame storage circuit 404 from the pixel array 402 for storage in the first set of storage devices 412.

Figure 9:
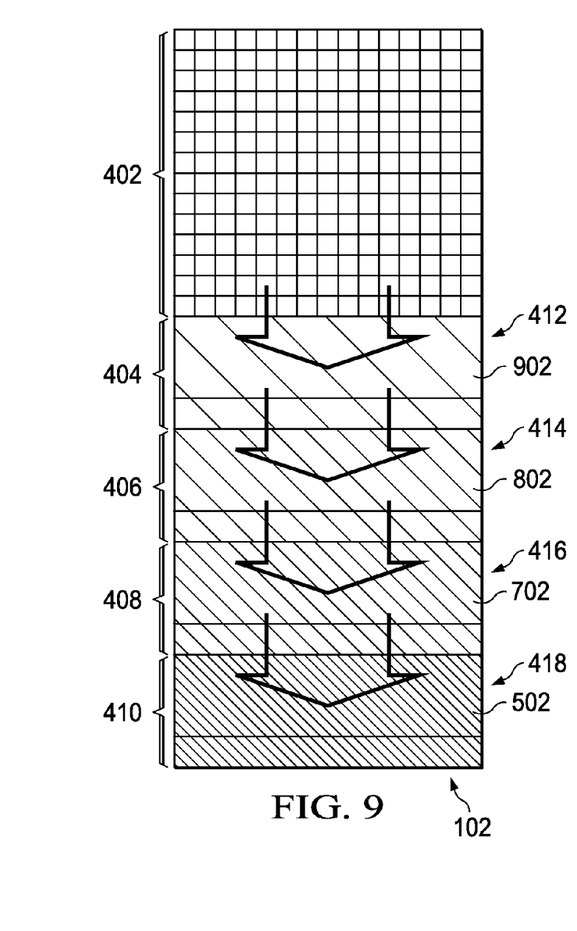
FIG. 9 illustrates a transfer of a first, second, third, and fourth set of charges in the time-of-flight sensor in accordance with at least one approach.

In an approach utilizing a fourth frame storage circuit 410, the above described process will continue at a fourth time, which is after the pixel array 402 generates a fourth set of charges 902 corresponding to a fourth image frame 308. As illustrated in FIG. 9, at the fourth time, the fourth frame storage circuit 410 receives the first set of charges 502 from the third frame storage circuit 408 for storage in the fourth frame storage circuit's 410 set of charge storage devices 418. Similarly, the second set of charges 702 is transferred to the third frame storage circuit 408 from the second frame storage circuit 406, the third set of charges 802 is transferred to the second frame storage circuit 406 from the first frame storage circuit 404, and the fourth set of charges 902 is transferred to the first frame storage circuit 404 from the pixel array 402 for storage in the first set of storage devices 412.

Figure 10:
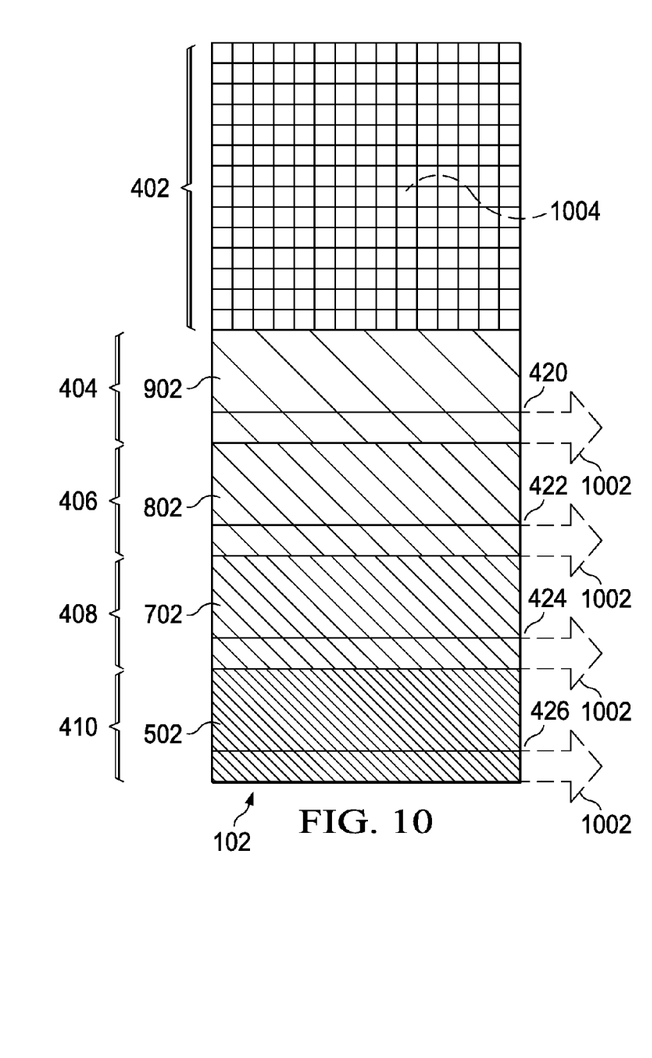
FIG. 10 illustrates an output of the charges from the time-of-flight sensor in accordance with at least one approach.

By this approach, after these transfers, the entire set of data comprising the four image frames 302, 304, 306, 308 will be stored in the four frame storage circuits 404, 406, 408, 410. It is not until this point (all image frames 302, 304, 306, 308 being captured) that the processing device 104 can make the depth map frame calculations 312. As is illustrated in FIG. 10, with all of the charge data 502, 702, 802, 902 captured and stored, the data is then ready for processing by the processing device 104 to determine one or more depth map frames 312. At a fifth time, each frame storage circuit 404, 406, 408, 410 can output 1002 its charge data 502, 702, 802, 902 through its respective output port 420, 422, 424, 426 in parallel to one another for processing by at least one processing device 104. The charge packets for each pixel 310 (i.e., X and Y charges 202) are typically fed individually to inputs of an analog-to-digital converter (ADC) to be converted into digital signals (i.e., binary) for processing by the processing device 104 to compute the depth map frame 312. The charge packets may also be processed in the analog domain, e.g., by operational amplifiers or charge domain processing techniques prior to ADC conversion. In one non-limiting example, each frame storage circuit 404, 406, 408, 410 can output 1002 the charge data for the same pixel 310 (i.e., charge X and Y for a specific pixel 310) in parallel to one another. By this, the processing device 104 can receive all charge data for that specific pixel 310 and can immediately calculate the depth data for that specific pixel 310 and store the calculated depth data into the depth map frame 312. By at least one approach, after the charge data has been collected and processed, it can be discarded and the next set of charge data for the next pixel 310 can be collected and processed.

So configured, the described approaches eliminate the need for additional memory to store the entirety of the plurality of image frames 302, 304, 306, 308 prior to processing because the charge data 502, 702, 802, 902 is stored on the time-of-flight sensor 102 as analog charge packets until such time as all charge data 502, 702, 802, 902 for all image frames 302, 304, 306, 308 has been collected and can be processed. It should be noted that a processing device 104 may utilize a buffer to store at least some of the charge data 502, 702, 802, 902 for various pixels 310 during processing so that the process of converting the charge data 502, 702, 802, 902 to digital signals, receiving the charge data 502, 702, 802, 902, and processing the charge data 502, 702, 802, 902 can occur in parallel for different pixels, like an assembly line, rather than exclusively in sequence (i.e., rather than waiting for one pixel to be completely processed before converting the charged data for the next pixel), so as to ensure the data 502, 702, 802, 902 is removed and processed as quickly as possible. However, this buffer may be sized to store far less data than makes up all the pixels 310 of each image frame 302, 304, 306, 308 so that the benefits of the various disclosed approaches may still be realized.

Advantageously by this approach, while the frame storage circuits 404, 406, 408, 410 are being read out 1002 as shown in FIG. 10, the pixel array 402 can begin to capture the first image frame 1004 of the next set of data for the next depth map frame (i.e., a fifth set of charges 1004). Once the frame storage circuits 404, 406, 408, 410 have been read out 1002 and are empty, the process can repeat itself and the newly captured first image frame 1004 can be transferred to the first frame storage circuit 404 for storage therein without waiting to generate the fifth set of charges 1004.

Figure 11:
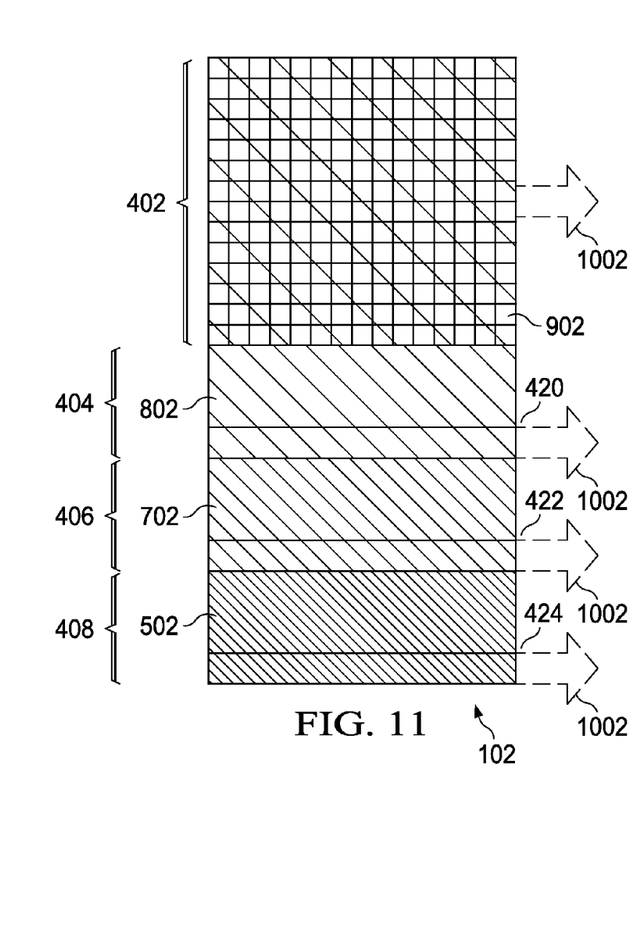
FIG. 11 illustrates an alternate output of the changes from the time-of-flight sensor in accordance with at least one approach.

In an alternative approach, the time-of-flight sensor 102 may be provided with one less frame storage circuit than the number of image frames to be captured. This alternative is shown in FIG. 11, where the optional fourth frame storage circuit 410 has been omitted. In this example, at the fourth time, after generating the fourth set of charges 902, the operation of outputting 1002 the charge data 502, 702, 802, 902 to the processing device 104 can begin immediately. Each of the frame storage circuits 404, 406, 408 outputs 1002 the charge data 502, 702, 802 through their respective output port 420, 422, 424 parallel to one another as previously described (with the first frame storage circuit 404 outputting 1002 the third set of charges 802, the second frame storage circuit 406 outputting 1002 the second set of charges 702, and the third frame storage circuit 408 outputting 1002 the first set of charges 502). However, the pixel array 402 outputs 1002 the fourth set of charges 902 to the processing device in parallel to the frame storage circuits 404, 406, 408 instead of transferring the fourth set of charges 902 to the first frame storage circuit 404. This alternative approach eliminates at least one extra transfer step to transfer all of all the charges 502, 702, 802, 902 to the next frame storage circuit, as well as eliminates an entire frame storage circuit (i.e., the fourth frame storage circuit 410), thus saving transfer time and silicon real estate.

Although many of these approaches have been described using as many as four frame storage circuits 404, 406, 408, 410 to store four image frames 302, 304, 306, 308, the approaches described herein can be expanded or restricted to accommodate any number of image frames used to calculate a depth map frame 312. Generally, the concept is most advantageously utilized when the number of storage frame circuits matches the required number of image frames (or one less when the above described alternative approach is utilized where one image frame is read 1002 directly out of the pixel array 402 instead of being stored to the frame storage circuit 404). However, even if the number of image frames outnumbers the storage capabilities of the time-of-flight sensor 102, the approaches described herein can still be utilized to at least reduce the number and/or size of memory required to store all the image frames as at least some of the image frames can be stored on the time-of-flight sensor 102 until all data is collected to be processed.

The various approaches described herein provide a solution that circumvents the need for additional memory storage space when collecting multiple time-of-flight image frames (i.e., image frames 302, 304, 306, 308) required for calculating a depth map frame 312. Depending upon the resolution of the pixel array 402, the required memory storage in conventional systems can scale rapidly. For example, 12-16 bits of digital data per pixel 310 is typically required to precisely capture the charge data 202. With even a modestly sized pixel array 402 of 1 mega-pixel (MP), as many as 16 megabytes (MB) are required for temporary storage of the 1 MP image frames (2 points of data per pixel (X and Y charge pair)×41 MB image frames×2 byte (16 bits) precision=16 MB). By storing this charge data 202 as analog charge packets until the charge data 202 is ready to be processed eliminates this extra memory, which reduces costs for products, reduces required PCB space, eliminates off-chip memory drivers to operate the memory, and eliminates any power consumed by the extra memory. This cost savings, space savings, and power savings makes the approaches described herein ideally suited for the competitive mobile device market, as well as other competitive markets where these aspects are limiting factors.

Further, storage of the charge packets 202 in analog form takes less silicon space than digitally storing the charge data 202. It is estimated that the area required to store the charge data 202 in the analog domain is typically one-half to one-quarter the size of the pixel 310 area. For example, a 4×4 um pixel 310 may only require 2×2 um of silicon space to store the analog charge packets. This is smaller than the space required for most current cost-effective digital memory solutions to store the 16-bits of digital information corresponding to the charge packet. Accordingly, the described solution not only eliminates an entire memory chip, but can actually achieve the same result with less silicon area. This makes the approaches described herein ideally suited for use with space-restricted form factor devices such as mobile devices and the like.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A time-of-flight image sensor comprising:
a plurality of time-of-flight sensor pixels, each time-of-flight sensor pixel being configured to generate at least one charge;
a first frame storage circuit having a first set of charge storage devices, the first frame storage circuit being operatively coupled to the plurality of time-of-flight sensor pixels and configured to:
   receive, at a first time, from the plurality of time-of-flight sensor pixels a first set of charges that correspond to charges generated by the plurality of time-of-flight sensor pixels prior to the first time;
   store the first set of charges in the first set of charge storage devices;
   receive, at a second time, from the plurality of time-of-flight sensor pixels a second set of charges that correspond to charges generated by the plurality of time-of-flight sensor pixels prior to the second time; and
   store the second set of charges in the first set of charge storage devices; and
a second frame storage circuit having a second set of charge storage devices, the second frame storage circuit being operatively coupled to the first frame storage circuit and configured to receive, at the second time from the first frame storage circuit, the first set of charges and to store the first set of charges in the second set of charge storage devices, wherein the first frame storage circuit and the second frame storage circuits are configured to output analog signal charge contents of the first and second frame storage circuits in parallel to one another for use by a processing device,
wherein each time-of-flight sensor pixel further comprises at least two photosites that are configured to generate a charge pair having a charge generated by each photosite of two different time segments, and wherein the first set of charges generated by the plurality of time-of-flight sensor pixels further comprises the charge pairs.

2. The time-of-flight image sensor of claim 1, wherein the time-of-flight image sensor further comprises
a third frame storage circuit having a third set of charge storage devices, the third frame storage circuit operatively coupled to the second frame storage circuit and configured to receive at a third time from the second frame storage circuit the first set of charges and to store the first set of changes in the third set of charge storage devices;
wherein the first frame storage circuit is configured to:
receive at a third time from the plurality of time-of-flight sensor pixels a third set of charges that correspond to charges generated by the plurality of time-of-flight sensor pixels prior to the third time and to store the third set of charges in the first set of charge storage devices;
and
wherein the second frame storage circuit is further configured to:
receive at the third time from the first frame storage circuit the second set of charges and to store the second set of charges in the second set of charge storage devices.

3. The time-of-flight image sensor of claim 2, wherein:
the first frame storage circuit is further configured to output at a fourth time the third set of changes for use by the processing device parallel to an output of the second frame storage circuit, the third frame storage circuit, and the plurality of time-of-flight sensor pixels;
the second frame storage circuit is further configured to output at the fourth time the second set of charges for use by the processing device parallel to the output of the first frame storage circuit, the third frame storage circuit, and the plurality of time-of-flight sensor pixels;
the third frame storage circuit is further configured to output at the fourth time the first set of charges for use by the processing device parallel to the output of the first frame storage circuit, the second frame storage circuit, and the plurality of time-of-flight sensor pixels; and
the plurality of time-of-flight sensor pixels are further configured to output at the fourth time a fourth set of charges correspond to charges generated by the plurality of time-of-flight sensor pixels prior to the fourth time, the plurality of time-of-flight sensor pixels further configured to output the fourth set of charges for use by the processing device parallel to the output of the first frame storage circuit, the second frame storage circuit, and the third frame storage circuit.

4. The time-of-flight image sensor of claim 2, wherein the time-of-flight image sensor further comprises:
a fourth frame storage circuit having a fourth set of charge storage devices, the fourth frame storage circuit operatively coupled to the third frame storage circuit and configured to receive at a fourth time from the third frame storage circuit the first set of charges and to store the first set of changes in the fourth set of charge storage devices;
wherein the first frame storage circuit is further configured to:
receive at a fourth time from the plurality of time-of-flight sensor pixels a fourth set of charges correspond to charges generated by the plurality of time-of-flight sensor pixels prior to the fourth time and to store the fourth set of charges in the first set of charge storage devices;
wherein the second frame storage circuit is further configured to:
receive at the fourth time from the first frame storage circuit the third set of charges and to store the third set of charges in the second set of charge storage devices;
wherein the third frame storage circuit is further configured to:
receive at the fourth time from the second frame storage circuit the second set of charges and to store the second set of charges in the third set of charge storage devices; and
wherein:
the first frame storage circuit is further configured to output at a fifth time the fourth set of changes for use by the processing device parallel to an output of the second frame storage circuit, the third frame storage circuit, and the fourth frame storage circuit;
the second frame storage circuit is further configured to output at the fifth time the third set of charges for use by the processing device parallel to the output of the first frame storage circuit, the third frame storage circuit, and the fourth frame storage circuit;
the third frame storage circuit is further configured to output at the fifth time the second set of charges for use by the processing device parallel to the output of the first frame storage circuit, the second frame storage circuit, and the fourth frame storage circuit; and
the fourth frame storage circuit is further configured to output at the fifth time the first set of charges for use by the processing device parallel to the output of the first frame storage circuit, the second frame storage circuit, and the third frame storage circuit.

5. The time-of-flight image sensor of claim 4, wherein the plurality of time-of-flight sensor pixels are configured to generate a fifth set of charges that correspond to charges generated by the plurality of time-of-flight sensor pixels during the fifth time.

6. The time-of-flight image sensor of claim 1, wherein the plurality of time-of-flight sensor pixels comprise a Charge-Coupled Device (CCD).

7. The time-of-flight image sensor of claim 1, wherein the second set of charges correspond to charges generated by the plurality of time-of-flight sensor pixels prior to the second time and after the first time.

8. A method comprising:
at a first time:
receiving by a first frame storage circuit having a first set of charge storage devices a first set of charges that correspond to charges generated by a plurality time-of-flight sensor pixels prior to the first time; and
storing by the first frame storage circuit the first set of charges in the first set of charge storage devices;
at a second time, wherein the second time is later than the first time:
receiving by a second frame storage circuit having a second set of charge storage devices the first set of charges from the first frame storage circuit;
storing by the second frame storage circuit the first set of charges in the second set of charge storage devices;
receiving by the first frame storage circuit a second set of charges that correspond to charges generated by of the plurality of time-of-flight sensor pixels prior to the second time; and storing by the first frame storage circuit the second set of charges in the first set of charge storage devices;

at a third time, wherein the third time is later than the second time:

the first frame storage circuit and the second frame storage circuit outputting parallel to one another contents of the first set of charge storage devices and second set of charge storage devices, respectively, for use by a processing device, wherein each time-of-flight sensor pixel further comprises at least two photosites of two different time segments that are configured to generate a charge pair having a charge generated by each photosite, and wherein receiving by the first frame storage circuit the first set of charges at the first time further comprises receiving by the first frame storage circuit the charge pairs.

9. The method of claim 8, wherein the method further comprises:

at the third time:

receiving by a third frame storage circuit having a third set of charge storage devices the first set of charges from the second frame storage circuit;

storing by the third frame storage circuit the first set of charges in the third set of charge storage devices;

receiving by the second frame storage circuit the second set of charges from the first frame storage circuit;

storing by the second frame storage circuit the second set of charges in the second set of charge storage devices;

receiving by the first frame storage circuit a third set of charges that correspond to charges generated by of the plurality of time-of-flight sensor pixels prior to the third time; and storing by the first frame storage circuit the third set of charges in the first set of charge storage devices.

10. The method of claim 9, wherein the method further comprises:

at a fourth time:

outputting by the first frame storage circuit the third set of charges for use by the processing device;

outputting by the second frame storage circuit the second set of charges for use by the processing device;

outputting by the third frame storage circuit the first set of charges for use by a processing device; and outputting by the plurality of time-of-flight sensor pixels a fourth set of charges that correspond to charges generated by the plurality of time-of-flight sensor pixels prior to the fourth time;

wherein first frame storage circuit, the second frame storage circuit, the third frame storage circuit, and the plurality of time-of-flight sensor pixels output their contents parallel to one another.

11. The method of claim 9, wherein the method further comprises:

at a fourth time:

receiving by a fourth frame storage circuit having a fourth set of charge storage devices the first set of charges from the third frame storage circuit;

storing by the fourth frame storage circuit the first set of charges in the fourth set of charge storage devices;

receiving by the third frame storage circuit the second set of charges from the second frame storage circuit;

storing by the third frame storage circuit the second set of charges in the third set of charge storage devices;

receiving by the second frame storage circuit the third set of charges from the first frame storage circuit;

storing by the second frame storage circuit the third set of charges in the second set of charge storage devices;

receiving by the first frame storage circuit a fourth set of charges that correspond to charges generated by of the plurality of time-of-flight sensor pixels prior to the fourth time; and storing by the first frame storage circuit the fourth set of charges in the first set of charge storage devices;

at a fifth time:

outputting by the first frame storage circuit the fourth set of charges for use by the processing device;

outputting by the second frame storage circuit the third set of charges for use by the processing device;

outputting by the third frame storage circuit the second set of charges for use by a processing device; and outputting by the fourth frame storage circuit the first set of charges for use by a processing device;

wherein first frame storage circuit, the second frame storage circuit, the third frame storage circuit, and the fourth frame storage circuit output their contents parallel to one another.

12. The method of claim 11, wherein the method further comprises:

at the fifth time:

generating a fifth set of charges that corresponding to charges generated by the plurality of time-of-flight sensor pixels.

13. The method of claim 8 wherein the plurality of time-of-flight sensor pixels further comprises a CCD.

14. The method of claim 8, wherein the method further comprises, at the second time, receiving by the first frame storage circuit the second set of charges that correspond to charges generated by the plurality of time-of-flight sensor pixels prior to the second time and after the first time.

15. A time-of-flight image sensor for use with a processing device and an illuminator, the time-of-flight image sensor comprising:

a plurality of time-of-flight sensor pixels each having at least two photosites, each photosite configured to generate a charge for a given frame;

a first frame storage circuit having a first set of charge storage devices, the first frame storage circuit operatively coupled to the plurality of time-of-flight sensor pixels and configured to:

receive, at a first time corresponding to a first frame, from the plurality of time-of-flight sensor pixels a first set of charges individually corresponding to individual charges generated by the plurality of time-of-flight sensor pixels during the first frame and to store the first set of charges in the first set of charge storage devices; and receive, at a second time corresponding to a second frame, from the plurality of time-of-flight sensor pixels a second set of charges individually corresponding to individual charges generated by the plurality of time-of-flight sensor pixels during the second frame and to store the second set of charges in the first set of charge storage devices;

receive, at a third time corresponding to a third frame, from the plurality of time-of-flight sensor pixels a third set of charges individually corresponding to individual charges generated by the plurality of time-of-flight sensor pixels during the third frame and to store the third set of charges in the first set of charge storage devices;

receive, at a fourth time corresponding to a fourth frame, from the plurality of time-of-flight sensor pixels a fourth set of charges individually corresponding to individual charges generated by the plurality of time-of-flight sensor pixels during the fourth frame and to store the fourth set of charges in the first set of charge storage devices;

output, at a fifth time, wherein the fifth time is after the fourth time, the fourth set of charges for use by the processing device;

a second frame storage circuit having a second set of charge storage devices, the second frame storage circuit operatively coupled to the first frame storage circuit and configured to:

receive, at the second time, from the first frame storage circuit the first set of charges and to store the first set of charges in the second set of charge storage devices;

receive, at the third time, from the first frame storage circuit the second set of charges and to store the second set of charges in the second set of charge storage devices;

receive, at the fourth time, from the first frame storage circuit the third set of charges and to store the third set of charges in the second set of charge storage devices;

output, at the fifth time and in parallel to the output of the first frame storage circuit, the third set of charges for use by the processing device;

a third frame storage circuit having a third set of charge storage devices, the third frame storage circuit operatively coupled to the second frame storage circuit and configured to:

receive, at the third time, from the second frame storage circuit the first set of charges and to store the first set of charges in the third set of charge storage devices;

receive, at the fourth time, from the second frame storage circuit the second set of charges and to store the second set of charges in the third set of charge storage devices;

output, at the fifth time and in parallel to the output of the first frame storage circuit and the second frame storage circuit, the second set of charges for use by the processing device;

and a fourth frame storage circuit having a fourth set of charge storage devices, the fourth frame storage circuit operatively coupled to the third frame storage circuit and configured to:

receive, at the fourth time, from the third frame storage circuit the first set of charges and to store the first set of charges in the fourth set of charge storage devices; and output, at the fifth time and in parallel to the output of the first frame storage circuit, the second frame storage circuit, and the third frame storage circuit, the first set of charges for use by the processing device, wherein each time-of-flight sensor pixel further comprises at least two photosites of two different time segments that are configured to generate a charge pair having a charge generated by each photosite, and wherein receiving by the first frame storage circuit the first set of charges at the first time further comprises receiving by the first frame storage circuit the charge pairs.

* * * * *